US008438368B2

(12) United States Patent
Numata (10) Patent No.: US 8,438,368 B2
(45) Date of Patent: May 7, 2013

(54) PROCESSING APPARATUS, PROCESSING SYSTEM, AND COMPUTER READABLE MEDIUM

(75) Inventor: Tetsuo Numata, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 502 days.

(21) Appl. No.: 12/416,624

(22) Filed: Apr. 1, 2009

(65) Prior Publication Data

US 2010/0077186 A1 Mar. 25, 2010

(30) Foreign Application Priority Data

Sep. 24, 2008 (JP) .................................. 2008-244337

(51) Int. Cl.
*G06F 9/00* (2006.01)
(52) U.S. Cl.
USPC .......................................... 712/220; 715/249
(58) Field of Classification Search ........................ None
See application file for complete search history.

(56) References Cited

U.S. PATENT DOCUMENTS

| 5,712,712 | A | * | 1/1998 | Sayward ........................ 358/403 |
| 5,713,032 | A | * | 1/1998 | Spencer ........................ 715/209 |
| 6,650,430 | B2 | * | 11/2003 | Francis et al. ............... 358/1.14 |
| 2005/0021980 | A1 | * | 1/2005 | Kanai ........................... 713/182 |
| 2005/0039034 | A1 | * | 2/2005 | Doyle et al. ................. 713/193 |
| 2005/0049977 | A1 | * | 3/2005 | Suisa .............................. 705/71 |
| 2006/0017955 | A1 | * | 1/2006 | Owen et al. ................. 358/1.13 |
| 2007/0188810 | A1 | * | 8/2007 | Nakagama et al. ............ 358/2.1 |
| 2007/0226748 | A1 | * | 9/2007 | Mizutani ....................... 719/310 |
| 2008/0123899 | A1 | * | 5/2008 | Rhoads ......................... 382/100 |

FOREIGN PATENT DOCUMENTS

JP 11-272616 A 10/1999
JP 2004-280665 A 10/2004

* cited by examiner

*Primary Examiner* — Eric Coleman
(74) *Attorney, Agent, or Firm* — Sughrue Mion, PLLC (57) ABSTRACT

Optimizing processing of a document sequentially processed by a plurality of image processing apparatuses that refer to an instruction document indicating the processing to be performed by each of the plurality of image processing apparatuses and respective security measures performed by each of the plurality of image processing apparatuses.

12 Claims, 10 Drawing Sheets

| INSTRUCTION DOCUMENT | | | |
|---|---|---|---|
| RULE ID | RULE INFORMATION | EXECUTION DEVICE IDENTIFIER | |
| 1 | 3 COPIES | 192.160.0.1 | |
| 2 | FAX TRANSMISSION 03-xxx-xxxx | 192.160.0.8 | |
| 3 | PREPARE HIGH-COMPRESSION PDF, TRANSFER TO SERVER | 192.160.0.20 | |

SECURITY CONDITION
- TINT BLOCK PRINTING
- IMAGE LOG STORING
- SIGNATURE
- ENCRYPTION

HISTORY RECORDING AREA

| INSTRUCTION DOCUMENT | | | |
|---|---|---|---|
| RULE ID | RULE INFORMATION | EXECUTION DEVICE IDENTIFIER | SECURITY CONDITION |
| 1 | 3 COPIES | 192.160.0.1 | TINT BLOCK PRINTING STORING OF IMAGE LOG |
| 2 | FAX TRANSMISSION 03-xxx-xxxx | 192.160.0.8 | NONE |
| 3 | PREPARE HIGH-COMPRESSION PDF, TRANSFER TO SERVER | 192.160.0.20 | SIGNATURE ENCRYPTION |
| HISTORY RECORDING AREA | | | |
| ⋮ | | | |

PROCESSING APPARATUS, PROCESSING SYSTEM, AND COMPUTER READABLE MEDIUM

CROSS-REFERENCE TO RELATED APPLICATIONS

This application is based on and claims priority under 35 U.S.C. 119 from Japanese Patent Application No. 2008-244337 filed Sep. 24, 2008.

BACKGROUND

Technical Field

The present invention relates to a processing apparatus, a processing system, and a computer readable medium.

SUMMARY

According to an aspect of the present invention, a processing apparatus includes: an execution unit that executes a predetermined processing; an execution request accept unit that accepts instruction information for instructing execution of a second processing including a plurality of first processing, and that accepts an execution request of the second processing; a process instruction unit that instructs, under a condition that one of a plurality of information leakage preventing processing to be executed can be executed in a case of processing one of the plurality of first processing which is requested by the instruction information so as to be executed by the execution unit except for information leakage preventing processing having been executed by a first processing apparatus other than the processing apparatus among the plurality of information leakage preventing processing, the execution unit to execute the one first processing, each of the plurality of information leakage preventing processing being a processing for preventing leakage of information which is performed at a time of executing the second processing instructed so as to be executed by the instruction information; an information leakage preventing process execution unit that executes, when the information leakage preventing processing to be executed can be executed in a case of processing the one of the plurality of first processing which is requested by the instruction information so as to be executed by the execution unit, the information leakage preventing processing; a recording unit that records, when the information leakage preventing processing to be executed is executed by the information leakage preventing process execution unit in a case of processing the one of the plurality of first processing which is requested by the instruction information so as to be executed by the execution unit, a fact of the execution of the information leakage preventing processing in the instruction information; and a transmission unit that transmits, when there is a second processing apparatus other than the processing apparatus, the second processing apparatus executing the plurality of first processing next based on the instruction information in a case of executing the one of the plurality of first processing by the execution unit, the instruction information and the execution request of the second processing.

BRIEF DESCRIPTION OF THE DRAWINGS

Exemplary embodiment of the present invention will be described in detail based on the following figures, wherein.

DETAILED DESCRIPTION

Hereinafter, embodiments of the invention will be explained.

First Embodiment

Figure 1:
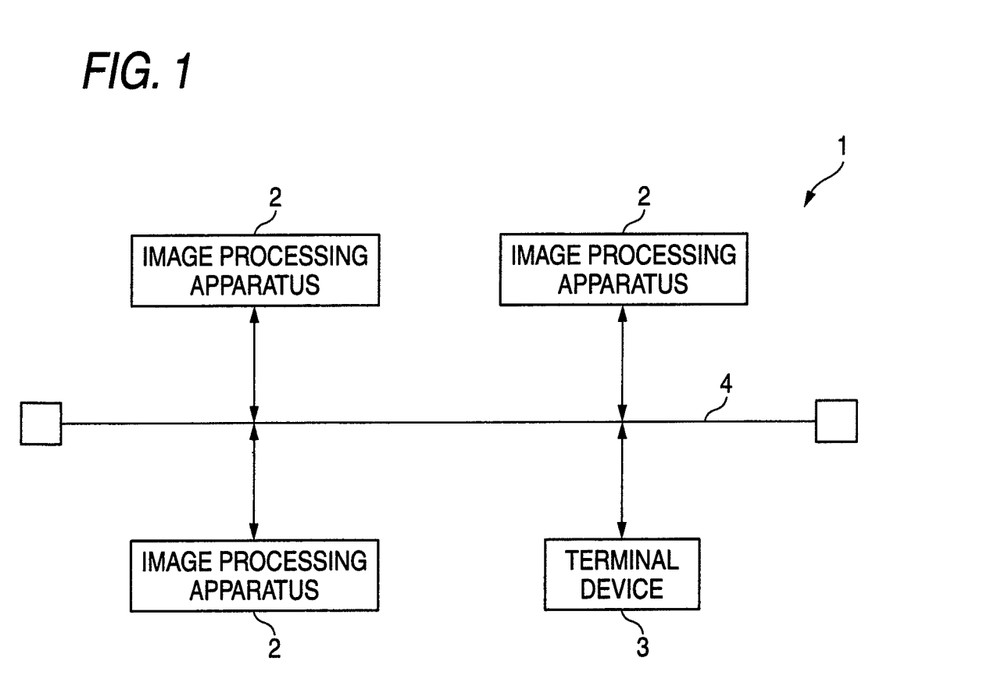
FIG. 1 is a block diagram showing the entire configuration of an image processing system according to the first embodiment of the invention.

FIG. 1 is a block diagram showing the entire configuration of an image processing system according to the first embodiment.

The image processing system 1 is configured in a manner that a plurality of image processing apparatuses 2 are coupled to a terminal device 3, through which a user instructs the image processing system 1 the execution of a processing, via a network 4 so as to be able to communicate to each other. Various kinds of server computers and a printer etc. are also coupled to the network 4.

Figure 2:
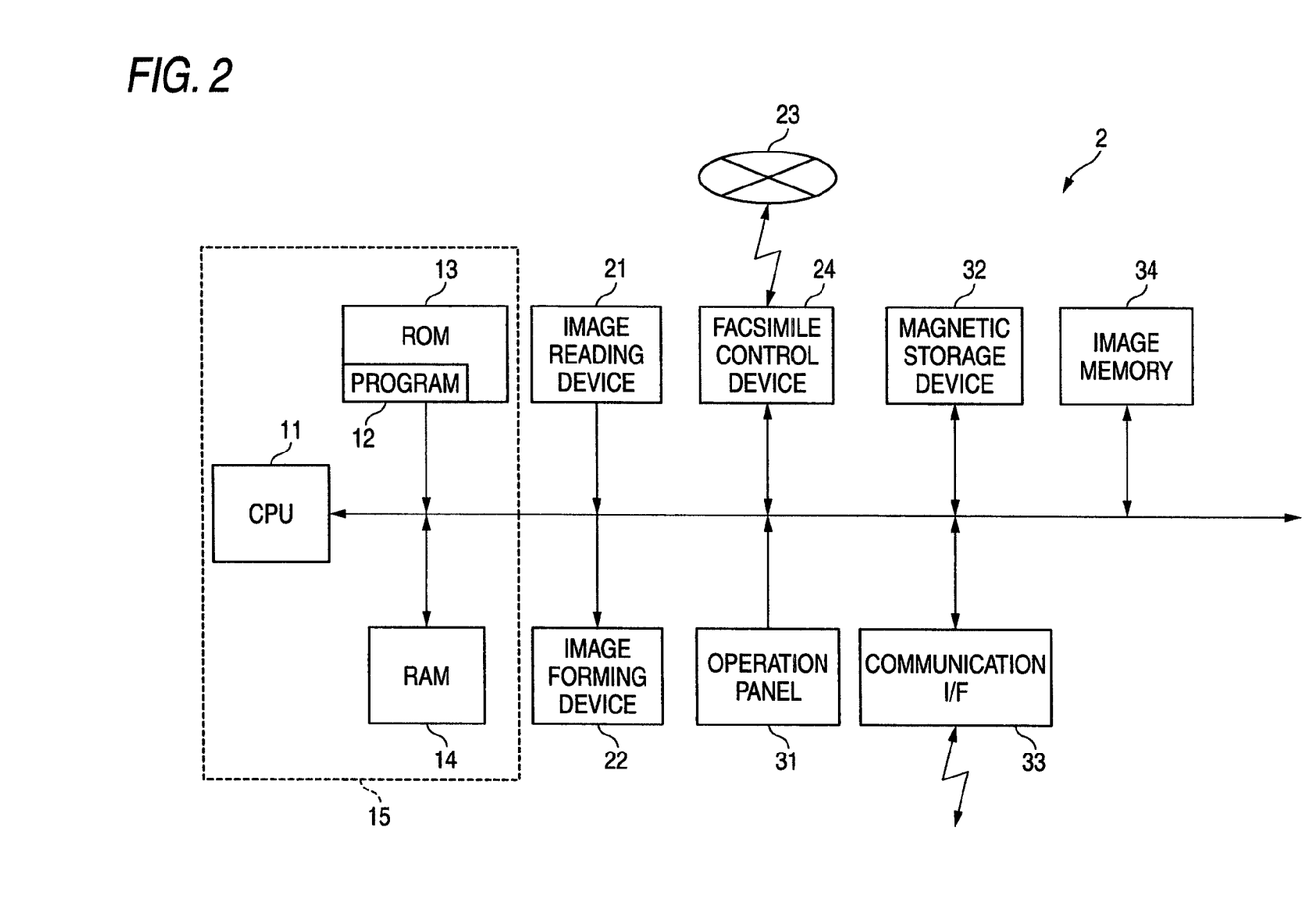
FIG. 2 is a block diagram showing the electrical connections of the image processing apparatus of the image processing system according to the first embodiment of the invention.

FIG. 2 is a block diagram showing the electrical connections of the image processing apparatus 2.

The image processing apparatus 2 includes a main control device 15 having a CPU 11 for performing various kinds of arithmetical operations and concentrically controlling respective portions, a ROM 13 for storing a program 12 executed by the CPU 11 and various kinds of fixed data and a RAM 14 acting as a work area of the CPU 11.

The main control device 15 is coupled to respective means for performing predetermined processing treating image data, that is, in this embodiment, an image reading device 21 for reading the image of a document, and an image forming device 22 for performing the processing of forming an image on a printing medium such as a paper. According to the type of the image processing apparatus 2, the main control device is further coupled to a facsimile control device 24 for transmitting and receiving facsimile data via a public telephone 23. Thus, the image processing apparatus 2 performs various kinds of processing such as a copying and a printing. Further, according to the type of the image processing apparatus, the image processing apparatus can perform the facsimile data transmission and reception processing and the scanning processing. The image forming device 22 can employ not only the electrophotographic method but also the ink-jet method, the silver photo method, the sublimatic type thermal transfer method, the fusion type thermal transfer method or the direct thermal printing method etc.

Further, the main control device 15 is coupled to an operation panel 31 which has a touch panel and various kinds of operation buttons, accepts varies kinds of operations from a user and displays various kinds of messages to a user, a magnetic storage device 32 for storing various kinds of data etc., a communication interface (I/F) 33 for communicating with a server and a PC via the network 4, and an image memory 34 for storing image data.

The program 12 may be stored in the ROM 13 from the first. Alternatively, the program 12 may be transmitted to the image processing apparatus 2 via the network 4 in the format of a carrier wave and the program 12 thus transmitted may be set up in the magnetic storage device 32 etc. Further alternatively, the program 12 may be provided in a state of being stored in a storage medium such as a CD, DVD or MO, then the storage medium may be read by a reading device and the program 12 thus read may be set up in the magnetic storage device 32 etc.

Further, according to the type of the image processing apparatus 2, the image processing apparatus has a special function of capable of preparing a high-compression PDF (Portable Document Format), for example, from image data according to the program 12.

Figure 3:
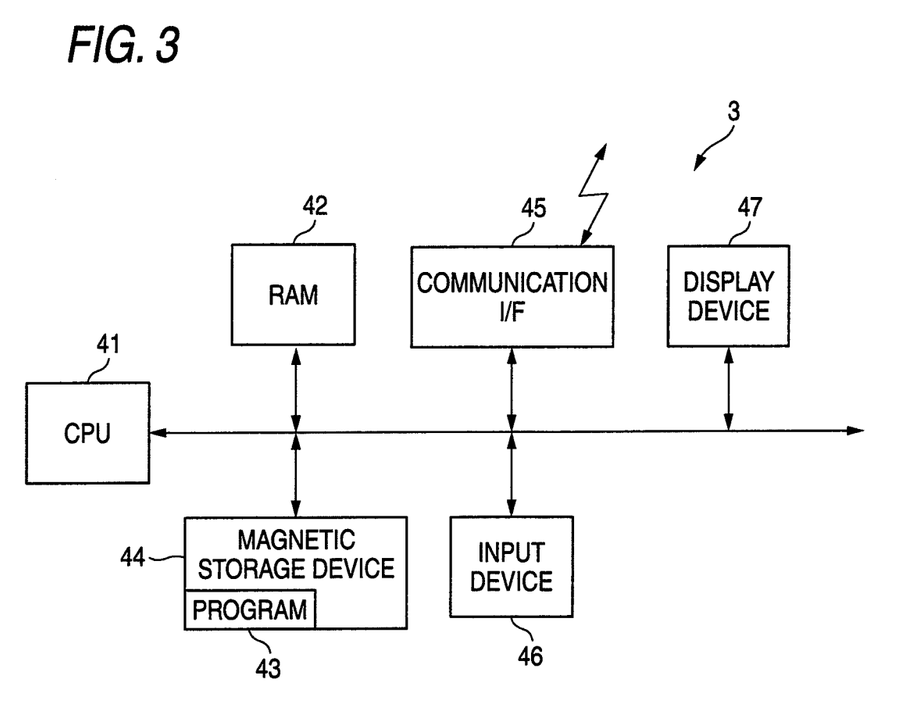
FIG. 3 is a block diagram showing the electrical connections of the terminal device of the image processing system according to the first embodiment of the invention.

FIG. 3 is a block diagram showing the electrical connections of the terminal device 3.

The terminal device 3 is configured in a manner that a CPU 41 for performing various kinds of arithmetical operations and concentrically controlling respective portions is coupled to a RAM 42 acting as a work area of the CPU 41, a magnetic storage device 44 for storing a program 43 executed by the CPU 41 and various kinds of fixed data etc., a communication interface (I/F) 45 for communicating with the image processing apparatus 2 via the network 4, an input device 46 such as a key board or a mouse, and a display device 47 such as a liquid crystal display.

The program 43 may be stored in the magnetic storage device 44 from the first. Alternatively, the program 43 may be transmitted to the image processing apparatus 2 via the network 4 in the format of a carrier wave and the program 43 thus transmitted may be set up in the magnetic storage device 44 etc. Further alternatively, the program 43 may be provided in a state of being stored in a storage medium such as a CD, DVD or MO, then the storage medium may be read by a reading device and the program 43 thus read may be set up in the magnetic storage device 44 etc.

Figure 4:
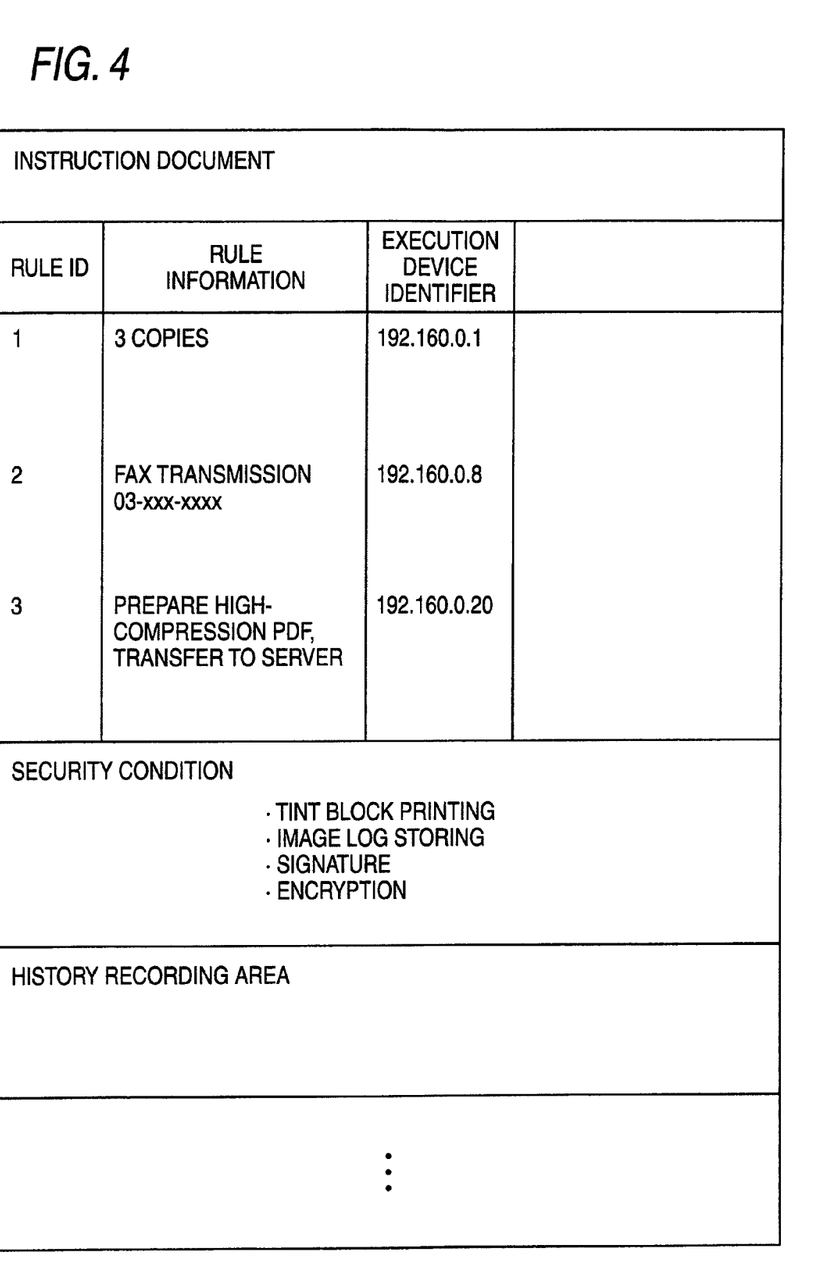
FIG. 4 is an explanatory diagram showing an example of the data configuration of an instruction document instructing the processing to be executed by the image processing system according to the first embodiment of the invention.

FIG. 4 is an explanatory diagram showing an example of the data configuration of an instruction document which is instruction information for instructing the processing executed by the image processing system 1.

The image processing system 1 can execute a parent processing (second processing) configured by a plurality of child processing (first processing) in accordance with the instruction document 51. That is, a plurality of the child processing contained in the parent processing are assigned to and processes by the image processing apparatuses 2. To be more concrete, the parent processing is executed by the plurality of the image processing apparatuses 2 according to a sequential processing in a manner that when the single image processing apparatus 2 processes one of the child processing contained in the parent processing in accordance with document data to be processed and the instruction document 51, the document data and the instruction document 51 are transferred to another of the image processing apparatuses 2 and then the another image processing apparatus 2 processes another of the child processing contained in the parent processing, then the document data and the instruction document 51 are transferred to still another of the image processing apparatuses 2 and then the still another image processing apparatus 2 processes still another of the child processing contained in the parent processing.

The explanation will be made as to an example where the image processing system 1 executes, in accordance with the instruction document 51, processing of (1) copying a document, then (2) faxing in accordance with the document data of the document and (3) preparing a high-compression PDF based on the document data, then transferring the PDF to a predetermined server and storing therein.

The instruction document 51 registers therein in an associated manner "rule information" instructing the content of the child processing executed in each of the image processing apparatuses 2, "rule IDs" which are identifiers for respectively identifying the rule information, and "execution device identifiers" which are identifiers for respectively identifying the image processing apparatuses 2 for executing the child processing. The child processing are executed in the order of the rule IDs.

In this example, an image processing apparatus A (see FIG. 5) having no fax function executes the copying of the document according to "1" of the rule ID, then an image processing apparatus B (see FIG. 5) having the fax function executes the faxing of the document according to "2" of the rule ID, and finally an image processing apparatus C (see FIG. 5) having the function of preparing the high-compression PDF prepares the high-compression PDF based on the document data and transfers the PDF to the predetermined server and stores therein according to "3" of the rule ID.

The instruction document 51 defines "a security condition" as processing to be executed in the respective image processing apparatuses 2 for executing the child processing in order to prevent the leakage of the information of a document at the time of executing a series of the parent processing based on the instruction document 51.

In this example, "preparation of image log", "tint block printing," "signature" and "encryption" are defined as the security condition.

The "image log" means to prepare and store image information (such as the thumbnail of a document image) representing the gist of a document to be outputted to the outside via a printing or a faxing.

The "tint block printing" is a means for maintaining the information security at the time of printing and acts to, when printing based on the document data, execute the printing so as to overlap an image such as a logo of a company or a user ID on a document to thereby appear the image such as the logo of the company or the user ID on a paper having been printed.

The "signature" means to electronically sign in a document data having been prepared. The "encryption" means to encrypt document data to be stored by the encryption method such as the public key cryptosystem.

Further, the instruction document 51 is provided with "a history recording area" for recording a history at the time of executing the child processing by the respective image processing apparatuses 2.

Plural such the instruction documents 51 are prepared. A user can operate the operation panel 31 of the image processing apparatus 2 or the terminal device 3 to select desired one of the instruction documents 51 to thereby perform the processing as to the document data to be processed based on the instruction of the instruction document 51 thus selected.

Figure 5:
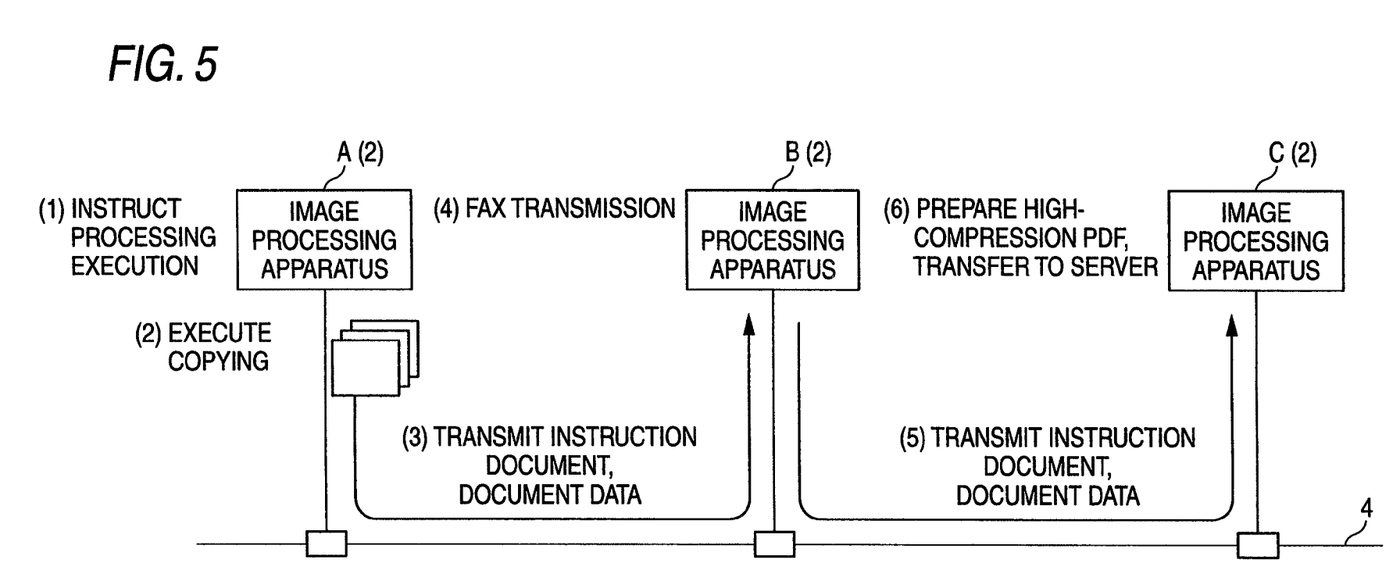
FIG. 5 is an explanatory diagram for explaining the processing procedure in the case of processing document data in accordance with an instruction document shown in FIG. 4 as an example, in the image processing system according to the first embodiment of the invention.

FIG. 5 is an explanatory diagram showing a processing procedure in the case of processing document data based on the instruction document 51 shown in FIG. 4 as an example.

In this example, the child processing described in the instruction document 51 are sequentially executed by the three image processing apparatuses 2, that is, image processing apparatuses A, B and C. First, the image processing apparatus A selects the instruction document 51 and instructs the execution of the processing.

This example executes the aforesaid processing of (1) copying a document, then (2) faxing in accordance with the document data of the document and (3) preparing a high-compression PDF based on the document data, then transferring the PDF to the predetermined server and storing therein.

First, the image processing apparatus A having selected the instruction document 51 and instructed the execution of the processing can (1) scan perform the copying processing for scanning a paper document set by a user and printing the scanned data. In this case, since the paper document is outputted outside in the copying processing, it is necessary to perform the "preparation of image log" and the "tint block printing" among the "preparation of image log", the "tint block printing", the "signature" and the "encryption" defined as the security condition. Thus, it is determined whether or not the image processing apparatus A can perform the "preparation of image log" and the "tint block printing". When determined to be yes, the image processing apparatus performs the copying processing of the paper document (2) and executes the "preparation of image log" and the "tint block printing". In this case, the copying processing to be executed by the image processing apparatus A and a history that the security condition is satisfied are recorded in the "history recording area" of the instruction document 51. Further, it is also recorded that the security condition executed in this case is the "preparation of image log" and the "tint block printing."

Since the image processing apparatus 2 for performing the processing next is the image processing apparatus B as to which "2" of the "rule ID" and the "execution device identifier" are registered in an association manner in the instruction document 51, the instruction document 51 is transmitted together with document data obtained by being scanned to the image processing apparatus B for performing the processing next (3). The image processing apparatus B can execute the facsimile transmission. In this case, among the "preparation of image log," "tint block printing," "signature" and "encryption" defined as the security condition, the determination is not made as to each of the "preparation of image log" and the "tint block printing" each recorded in the "history recording area" as having been executed by the image processing apparatus A. However, it is determined as to whether or not any of the "signature" and the "encryption," which are the remaining security condition, is to be executed by the image processing apparatus B and whether or not the any of the "signature" and the "encryption" determined to be executed can be executed by the image processing apparatus B. Since the "signature" and the "encryption" are not performed at the time of the facsimile transmission, the image processing apparatus B does not execute the security condition. Thus, the document data transmitted from the image processing apparatus A is transmitted by fax to a transmission destination designated in advance (4).

Then, since the image processing apparatus 2 for performing the processing next is the image processing apparatus C as to which "3" of the "rule ID" and the "execution device identifier" are registered in an association manner in the instruction document 51, the instruction document 51 is transmitted together with document data obtained to the image processing apparatus C for performing the processing next (5). The image processing apparatus C can prepare a high-compression PDF based on the document data. In this case, among the "preparation of image log," "tint block printing," "signature" and "encryption" defined as the security condition, the determination is not made as to each of the "preparation of image log" and the "tint block printing" each recorded in the "history recording area" as having been executed by the image processing apparatus A. However, it is determined as to whether or not any of the "signature" and the "encryption," which are the remaining security condition, is to be executed by the image processing apparatus C and whether or not the any of the "signature" and the "encryption" determined to be executed can be executed by the image processing apparatus C. Since the "signature" is to be executed at the time of preparing a high-compression PDF and the "encryption" is to be performed at the time of storing the document data in the server. Thus, it is determined whether or not the image processing apparatus C can perform the "signature" and "encryption". When it is determined yes, a high-compression PDF is prepared and the "signature" is executed. Then, the high-compression PDF thus prepared is subjected to the "encryption" processing and transferred to the predetermined server (6).

Figure 6:
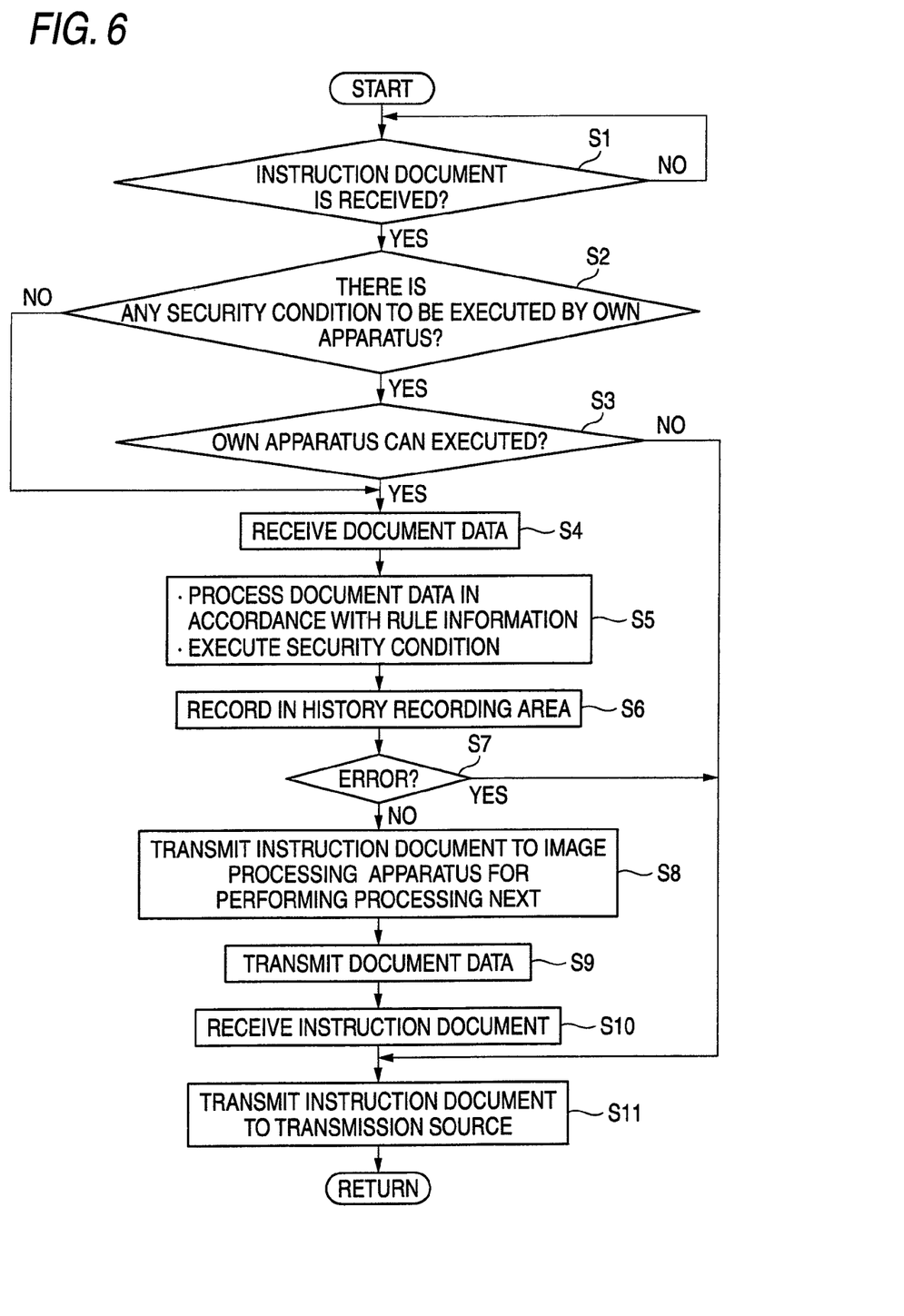
FIG. 6 is a flowchart showing the processing executed by the image processing apparatus of the image processing system according to the first embodiment of the invention.

FIG. 6 is a flowchart showing the processing executed by the main control device 15 of the image processing apparatus 2 which can execute the aforesaid processing.

First, when the instruction document 51 to be executed is received from the image processing apparatus 2 having executed the processing precedingly or by operating the operation panel 31 of the own image processing apparatus to be executed from now (Yes in step S1), it is determined, among the processing defined as the "security condition" of the instruction document 51, whether or not there is any processing to be executed by the own image processing apparatus except for the processing or the processing having been executed by the image processing apparatus 2 having executed the processing precedingly based on the description of the "history recording area" (step S2) and also it is determined whether or not the own image processing apparatus can execute the any processing to be executed (step S3).

When it is determined that there is any processing to be executed by the own image processing apparatus (Yes in step S2) and the own image processing apparatus can execute the any processing to be executed (Yes in step S3), or when it is determined that there is no processing to be executed by the own image processing apparatus (No in step S2), the document data to be processed is received from the image processing apparatus 2 having executed the processing precedingly (step S4). Then, the document data is processed in accordance with the rule information of the instruction document 51, and further when there is the "security condition" to be executed by the own image processing apparatus, the security condition is executed (step S5) Then, the processing result executed by the image processing apparatus 2 based on the rule information and information representing which of the security condition is executed are recorded in the "history recording area" (step S6).

In the case where these processing are performed without causing any error (No in step S7), if there is the image processing apparatus 2 of the execution device identifier stored in association with the next rule ID (the image processing apparatus 2 for performing the processing next), the instruction document 51 is transmitted to this image processing apparatus 2 (step S8) and the document data having been processed is also transmitted to this image processing apparatus 2 (step S9) When there is such the image processing apparatus 2, the instruction document 51 describing the processing result in this image processing apparatus 2 is received from this image processing apparatus 2 (step S10), and this instruction document 51 is transmitted to the image processing apparatus 2 which is the transmission source of the instruction document 51 received in step S1 (step S11).

The instruction document 51 is transmitted to the image processing apparatus 2 which is the transmission source of the instruction document 51 (step S11) when it is determined that the own image processing apparatus can not execute the any processing to be executed by the own image processing apparatus (No in step S3) and also when the processing result is erroneous (Yes in step S7).

According to the image processing system 1 explained above, it is possible to prevent that the image processing apparatus 2 wastefully determines whether or not the security condition described in the instruction document 51 is to be executed in relation to the execution of the processing of the image processing apparatus 2.

Figure 7:
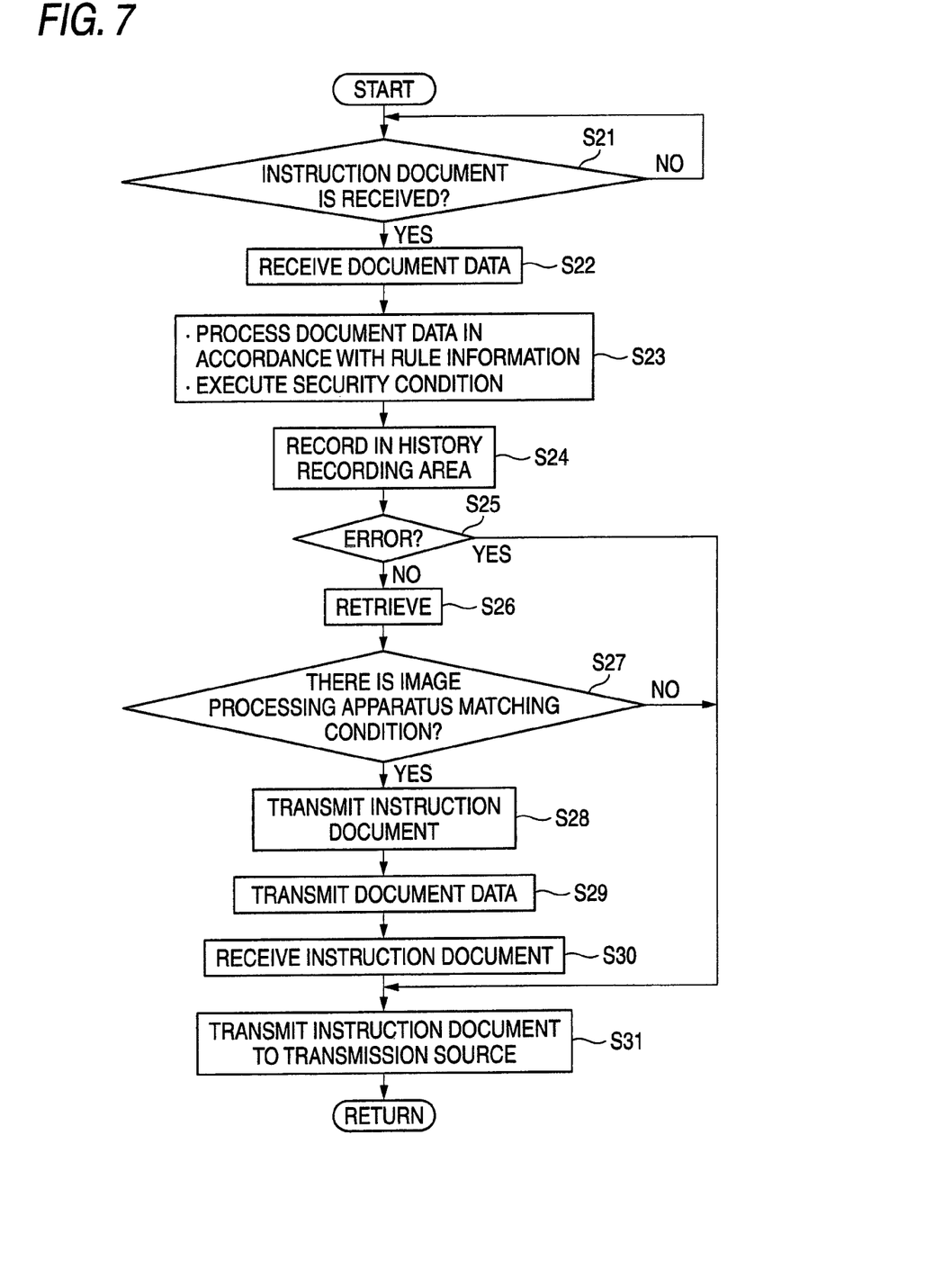
FIG. 7 is a flowchart for explaining the processing of a modified example of FIG. 6.

FIG. 7 is a flowchart showing a modified example of the processing shown in FIG. 6.

In the aforesaid processing, the image processing apparatus 2 having received the instruction document 51 determines whether or not the own image processing apparatus can satisfy the security condition defined in the instruction document 51. However, in this case, when it is determined that the image processing apparatus 2 can not satisfy the security condition, the processing will be terminated without executing the processing instructed by the instruction document 51.

According to the processing in FIG. 7, when the image processing apparatus 2 executes the processing, this image processing apparatus 2 retrieves another of the image processing apparatuses 2 for performing the processing to be executed next. At the time of this retrieval, this image processing apparatus retrieves the another image processing apparatus 2 which can perform the processing to be executed next and also the security condition to be executed next.

That is, when the image processing apparatus 2 receives the instruction document 51 from the image processing apparatus 2 having executed the processing precedingly or by operating the operation panel 31 of the own image processing apparatus (Yes in step S21), the own image processing apparatus receives the document data to be processed from the image processing apparatus 2 having executed the processing precedingly (step S22). Then, the own image processing apparatus processes the document data in accordance with the rule information of the instruction document 51, and further executes the "security condition" to be executed by the own image processing apparatus (step S23). Then, the processing result executed by the own image processing apparatus 2 based on the rule information and information representing which of the security condition is executed are recorded in the "history recording area" (step S24).

In the case where these processing are performed without causing any error (No in step S25), the retrieval is made as to another of the image processing apparatuses 2 which can execute the processing to be executed next described in the rule information of the instruction document 51 and also can execute the security condition when there is such the security condition to be executed at the time of executing the processing (step S26). At the time of determining whether or not the security condition is satisfied, so as not to perform a wasteful determining processing, the determination is made except for the security condition having been executed by other or others of the image processing apparatuses 2 having executed the processing precedingly or the own image processing apparatus.

According to this retrieval, when there is the image processing apparatus 2 matching with the condition (Yes in step S27), the instruction document 51 is transmitted to this image processing apparatus 2 (step S28) and the document data having been processed is also transmitted to this image processing apparatus 2 (step S29). When there is such the image processing apparatus 2, the instruction document 51 describing the processing result in this image processing apparatus 2 is received from this image processing apparatus 2 (step S30), and this instruction document 51 is transmitted to the image processing apparatus 2 which is the transmission source of the instruction document 51 received in step S1 (step S31).

The instruction document 51 is transmitted to the image processing apparatus 2 which is the transmission source of the instruction document 51 received in step S1 (step S31) when the processing result is erroneous (Yes in step S25) and also when there is not the image processing apparatus 2 matching with the condition (No in step S27).

According to the processing shown in FIG. 7, the next processing can be executed by the image processing apparatus 2 which can satisfy the necessary security condition.

Second Embodiment

The hardware configuration of the first embodiment explained with reference to FIGS. 1 to 3 is same in this embodiment and hence the detailed explanation thereof is omitted.

In this embodiment, the instruction document 51 is sequentially transmitted to the respective image processing apparatuses 2 before each of the image processing apparatuses 2 executes the processing described on the instruction document 51. Then, each of the image processing apparatuses 2 does not execute the processing but determines whether or not the own image processing apparatus can execute the security condition which is required to be satisfied at the time of performing the processing to be executed by the own image processing apparatus 2, and then the image processing apparatuses sequentially record the determination results in the "history recording area" of the instruction document 51. In this manner, each of the image processing apparatuses 2 checks in advance whether or not the security condition can be satisfied.

After performing the checking, since it is proved that each of the image processing apparatuses 2 satisfies the security condition, each of the image processing apparatuses 2 can execute the processing in accordance with the instruction of the instruction document 51 without determining whether or not each of the image processing apparatuses 2 satisfies the security condition unlike the first embodiment.

Figure 8:
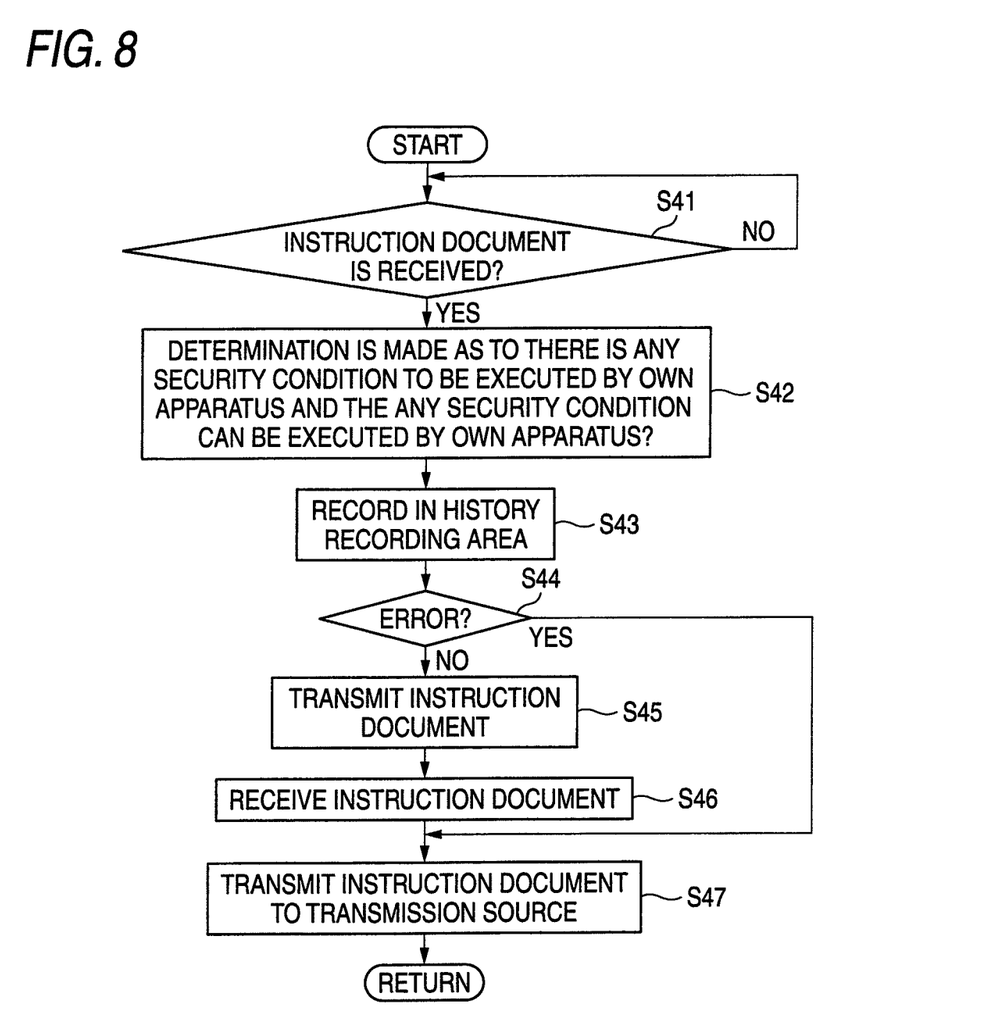
FIG. 8 is a flowchart showing the processing for checking in advance whether or not the image processing apparatus satisfies a security condition, in the image processing system according to the second embodiment of the invention.

FIG. 8 is a flowchart showing the processing for checking in advance whether or not the image processing apparatus 2 satisfies the security condition.

First, when the instruction document 51 to be executed is received from the image processing apparatus 2 having executed the processing precedingly or by operating the operation panel 31 of the own image processing apparatus (Yes in step S41), it is determined, among the processing defined as the "security condition" of the instruction document 51, whether or not there is any processing to be executed by the own image processing apparatus except for the processing or the processing having been executed by the image processing apparatus 2 having executed the processing precedingly based on the description of the "history recording area" and also it is determined whether or not the own image processing apparatus can execute the any processing to be executed (step S42).

Such the determination result is recorded in the "history recording area" of the instruction document 51 (step S43). That is, there are recorded data representing whether or not the any processing to be executed can be executed by the own image processing apparatus among the processing defined as the "security condition" of the instruction document 51, identifiers for identifying the "security condition" as to which it is determined whether or not the any processing to be executed can be executed, and an identifier fro identifying the own image processing apparatus. Thus, it will be clear that which of the image processing apparatuses 2 can or can not execute which of the processing of the "security condition."

In the case where these processing are performed without causing any error (No in step S44), when there is the image processing apparatus 2 of the execution device identifier stored in association with the next rule ID, the instruction document 51 is transmitted to this image processing apparatus 2 (step S45). When there is such the image processing apparatus 2, the instruction document 51 describing the processing result of this image processing apparatus 2 is received from this image processing apparatus 2 (step S46), and the instruction document 51 is transmitted to the image processing apparatus 2 which is the transmission source of the instruction document 51 received in step S1 (step S47).

In contrast, when the processing result is erroneous (Yes in step S44), the instruction document 51 is transmitted to the image processing apparatus 2 which is the transmission source of the instruction document 51 (step S47). The determination result of step S42 may not be recorded in the "history recording area" of the instruction document 51 but may be transmitted to the image processing apparatus 2 which transmitted the instruction document 51 at first.

Figure 9:
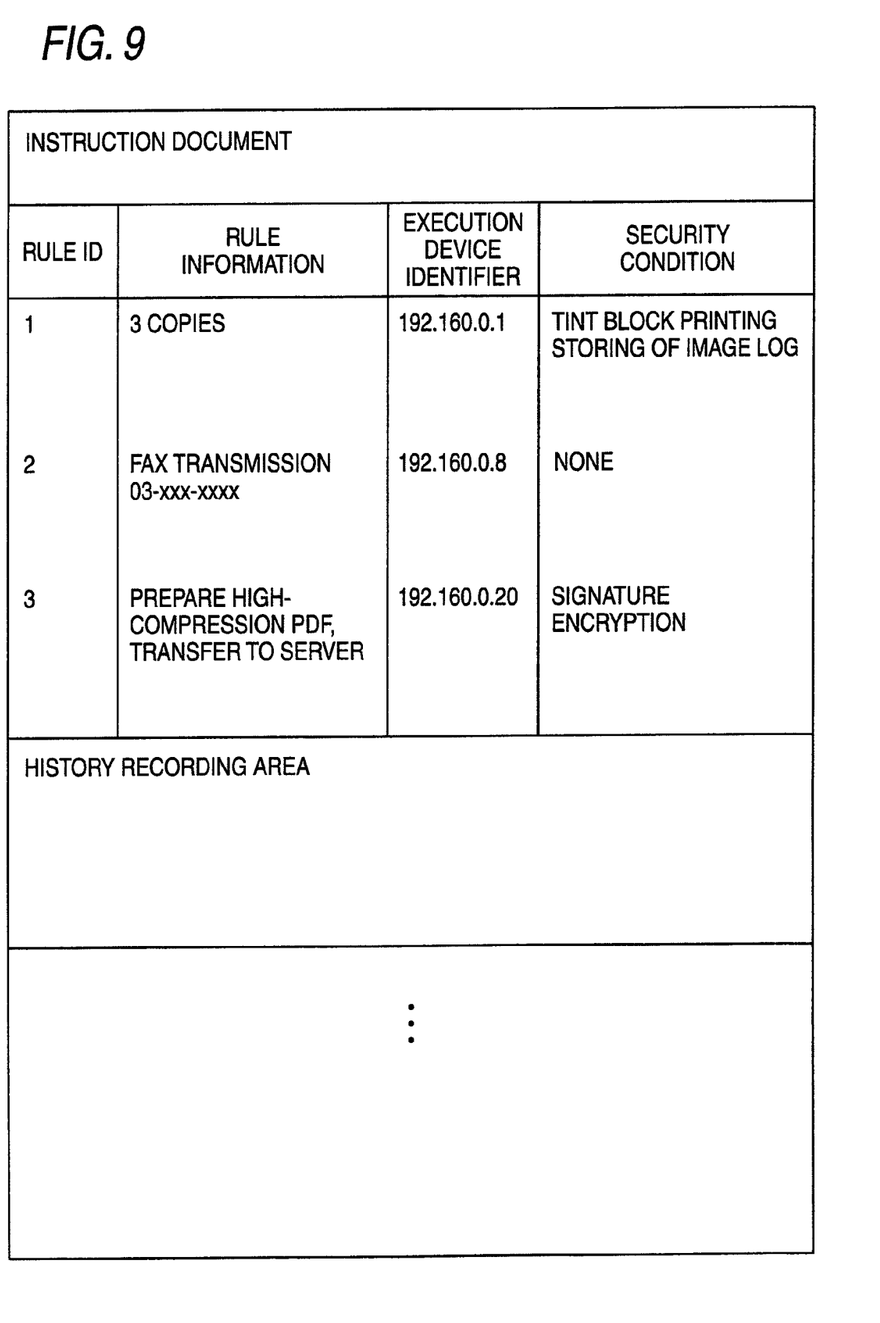
FIG. 9 is an explanatory diagram showing an example of the data configuration of an instruction document instructing the processing to be executed by the image processing system according to the second embodiment of the invention.

When each of the image processing apparatuses 2 confirms in advance that the "security condition" is satisfied, the respective "security condition" are recorded in the instruction document 51 in relation with the respective "rule IDs" (FIG. 9). When the "security condition" to be executed by each of the image processing apparatuses 2 is uniquely determined in the instruction document 51, each of the image processing apparatuses 2 is not required to determine whether or not the "security condition" is satisfied.

Figure 10:
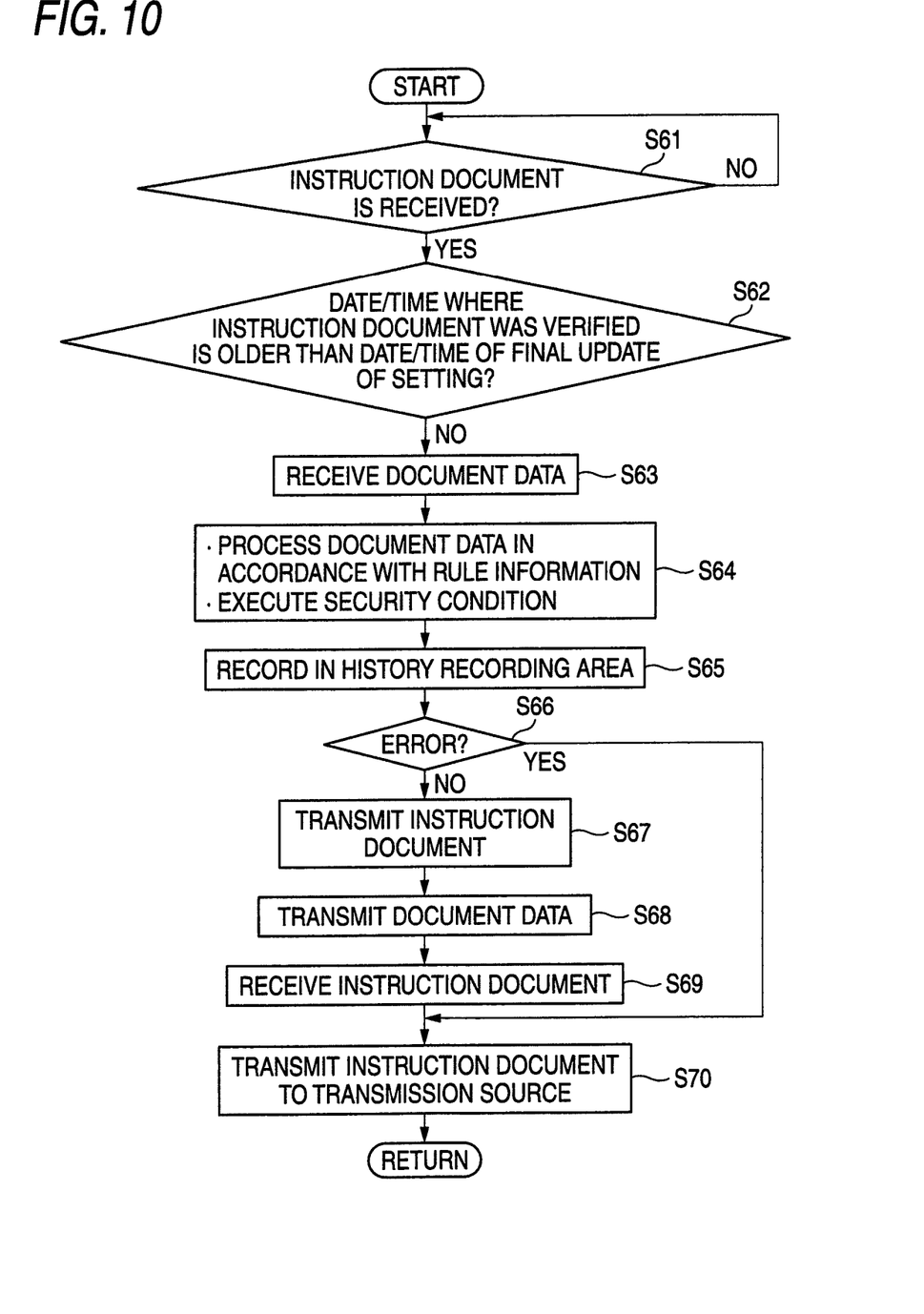
FIG. 10 is a flowchart showing the processing executed by the image processing apparatus 2 in accordance with an instruction document of FIG. 8 in the image processing system according to the second embodiment of the invention.

FIG. 10 is a flowchart showing the processing executed by the image processing apparatus 2 in accordance with the instruction document 51 of FIG. 8.

First, when the image processing apparatus 2 receives the instruction document 51 from the image processing apparatus 2 having executed the processing precedingly or by operating the operation panel 31 of the own image processing apparatus (Yes in step S61), it is determined whether or not date/time where the instruction document was verified is older than date/time of the final update of the setting of the "security condition" of the own image processing apparatus (step S62). That is, the date/time verified by the processing of FIG. 8 is described in the instruction document 51. The instruction document used in the processing of FIG. 10 is the instruction document shown in FIG. 9.

When the date/time where the instruction document was verified is newer than the date/time of the final update of the setting of the "security condition" of the own image processing apparatus (No in step S62), the document data to be processed is received from the image processing apparatus 2 performing the processing precedingly (step S63). Then, the document date is processed in accordance with the rule information of the instruction document 51. When there is the "security condition" designated by the instruction document 51, this "security condition" is executed (step S64). Then, the processing result executed by the image processing apparatus 2 based on the rule information and the result of the security condition having been executed are recorded in the "history recording area" (step S65).

In the case where these processing are performed without causing any error (No in step S66), when there is the image processing apparatus 2 of the execution device identifier stored in association with the next rule ID, the instruction document 51 is transmitted to this image processing apparatus 2 (step S67) and further the document data having been processed is transmitted to this image processing apparatus 2 (step S68). When there is such the image processing apparatus 2, the instruction document 51 describing the processing result of this image processing apparatus 2 is received from this image processing apparatus 2 (step S69), and the instruction document 51 is transmitted to the image processing apparatus 2 which is the transmission source of the instruction document 51 received in step S1 (step S70).

When it is determined that the date/time where the instruction document was verified is older than the date/time of the final update of the setting of the "security condition" of the own image processing apparatus (Yes in step S62) or the processing result is erroneous (Yes in step S66), the instruction document 51 is transmitted to the image processing apparatus 2 which is the transmission source of the instruction document 51 (step S70). The reason why the processing of step S64 is not executed when the date/time where the instruction document was verified is older than the date/time of the final update of the setting of the "security condition" of the own image processing apparatus is that the setting of the "security condition" may be changed and so there is a possibility that the instruction document 51 verified in the processing of FIG. 8 can not be used.

In this manner, according to the processing of FIG. 10, it is possible to prevent that the image processing apparatus 2 having received the instruction document 51 wastefully determines whether or not there is the "security condition" to be executed and whether or not the "security condition" can be executed.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A processing apparatus comprising:
an execution unit that executes processing on a document;
an execution request accept unit that accepts instruction information, the instruction information comprising a first instruction that instructs another processing apparatus to execute a first processing to be performed on the document, a second instruction that instructs the processing apparatus to execute a second processing to be performed on the document after the first processing, and a security instruction that indicates a security processing to be performed on the document;
a process instruction unit that performs the second processing indicated by the second instruction in the instruction information;
an information leakage preventing process execution unit that determines whether the another processing apparatus performs the security processing on the document after the first processing based on the instruction information and executes, in response to determining that the another processing apparatus does not perform the security processing, the security processing on the document; and
a recording unit that records, in response to the processing apparatus performing the security processing on the document, execution information that indicates the processing apparatus performed the security processing on the document in the instruction information.

2. A processing apparatus comprising:
an execution unit that executes a processing on a document;
an execution request accept unit that accepts instruction information, the instruction information comprising a first instruction that instructs the processing apparatus to execute a first processing to be performed on the document, a second instruction that instructs a second processing apparatus to execute a second processing to be performed on the document after the first processing, a first security instruction that indicates a first security processing to be performed on the document, and a second security instruction that indicates a second security processing to be performed on the document;
a process instruction unit that performs the first processing indicated by the first instruction in the instruction information;
an information leakage preventing process execution unit that executes the first security processing on the document;
a retrieval unit that determines, in response to performing the first processing and the first security processing, whether the second processing apparatus is capable of performing the second security processing; and
a transmission unit that transmits the instruction information and the document to the second processing apparatus, in response to the retrieval unit determining that the second processing apparatus is capable of performing the second security processing.

3. A processing system comprising:
a first processing apparatus; and
a second processing apparatus,
wherein the first processing apparatus comprises:
a first execution unit that executes processing on a document;
a first confirmation request accept unit that accepts instruction information, the instruction information comprising a first instruction that instructs the first processing apparatus to execute a first processing to be performed on the document, a second instruction that instructs the second processing apparatus to execute a second processing to be performed on the document after the first processing, a first security instruction that indicates a first security processing to be performed on the document, and a second security instruction that indicates a second security processing to be performed on the document;
a first recording unit that determines the first processing apparatus is capable of performing the first security processing and records a result of the determination in the instruction information; and
a first transmission unit that transmits, in response to the first recording unit recording the result, the instruction information to the second processing apparatus,
wherein the second processing apparatus comprises:
a second execution unit that executes processing on the document;
a second confirmation request accept unit that accepts from the first processing apparatus the instruction information including the result;
a second recording unit that determines the second processing apparatus is capable of performing the second security processing and records a second result of the determination in the instruction information; and
a second transmission unit that transmits, in response to the second recording unit recording the result, the instruction information to the first processing apparatus,
wherein the first processing apparatus further comprises:
a first execution request accept unit that accepts from the second processing apparatus the instruction information including the first result and the second result;
a first process instruction unit that performs the first processing indicated by the first instruction in the instruction information; and
a first information leakage preventing process execution unit that executes the first security processing on the document,
wherein the first transmission unit that transmits, in response to the first process instruction unit and the first information leakage preventing process execution unit executing the first processing and first security processing, the instruction information to the second processing apparatus, and
wherein the second processing apparatus further comprises:
a second execution request accept unit that accepts from the first processing apparatus the instruction information including the first result and the second result;
a second process instruction unit that performs the second processing indicated by the second instruction in the instruction information; and
a second information leakage preventing process execution unit that executes the second security processing on the document.

4. A processing system comprising:
a plurality of processing apparatuses each of which has execution unit that executes processing on a document; and
an execution request apparatus that requests the plurality of processing apparatuses to execute the processing,
wherein each of the plurality of processing apparatuses comprises:
an execution request accept unit that accepts instruction information, the instruction information comprising instructions that instruct the plurality of processing apparatuses to executing processing to be performed on the document and a security instruction that indicates a security processing to be performed on the document;

a process instruction unit that performs the processing indicated in the instruction information;

an information leakage preventing process execution unit that determines whether the processing apparatus is able to perform the security processing on the document after the processing and executes, in response to determining that the processing apparatus is capable of performing the security processing, the security processing; and a recording unit that records, in response to the processing apparatus performing the security processing on the document, execution information that indicates the processing apparatus performed the security processing on the document in the instruction information.

5. A non-transitory computer readable medium storing a program causing a computer to execute a process for performing a process control, the process comprising:

executing processing on a document;

accepting instruction information, the instruction information comprising a first instruction that instructs a first processing apparatus to execute a first processing to be performed on the document, a second instruction that instructs a second processing apparatus to execute a second processing to be performed on the document after the first processing, and a security instruction that indicates a security processing to be performed on the document;

performing, by the second processing apparatus, the second processing indicated by the second instruction in the instruction information;

determining whether the first processing apparatus performs the security processing on the document after the first processing and executing, in response to determining that the first processing apparatus does not perform the security processing, the security processing on the document; and recording, in response to the processing apparatus performing the security processing on the document, execution information that indicates the second processing apparatus performed the security processing on the document in the instruction information.

6. A processing apparatus comprising:

an execution unit configured to execute processing on a document;

a receiving unit configured to receive instruction information including a plurality of instructions from a first processing apparatus;

a first determination unit configured to determine whether the plurality of instructions included in the received instruction information includes a security instruction which has not been executed and which indicates a security processing to be performed on the document by the execution unit;

a second determination unit configured to determine whether the security processing can be performed by the execution unit if the first determination unit determines that the instruction information includes the security instruction, wherein if the second determination unit determines that the security processing can be performed by the execution unit, the receiving unit receives the document from the first processing apparatus and the execution unit performs the security processing on the received document, a recording unit that records execution information that indicates the execution unit performed the security processing on the document in the instruction information; and a transmission unit configured to transmit, to a second processing apparatus, the instruction information including the execution information and the document processed by the execution unit.

7. The processing apparatus according to claim 1, wherein the security processing comprises at least one of preparation of an image log, tint block printing, signature, and encryption.

8. The processing apparatus according to claim 2, wherein the security processing comprises at least one of preparation of an image log, tint block printing, signature, and encryption.

9. The processing system according to claim 3, wherein the security processing comprises at least one of preparation of an image log, tint block printing, signature, and encryption.

10. The processing system according to claim 4, wherein the security processing comprises at least one of preparation of an image log, tint block printing, signature, and encryption.

11. The computer readable medium according to claim 5, wherein the security processing comprises at least one of preparation of an image log, tint block printing, signature, and encryption.

12. The processing apparatus according to claim 6, wherein the security processing comprises at least one of preparation of an image log, tint block printing, signature, and encryption.

* * * * *